(No Model.) 2 Sheets—Sheet 1.
J. Z. TAYLOR.
SHIPPING CRATE.
No. 522,538. Patented July 3, 1894.
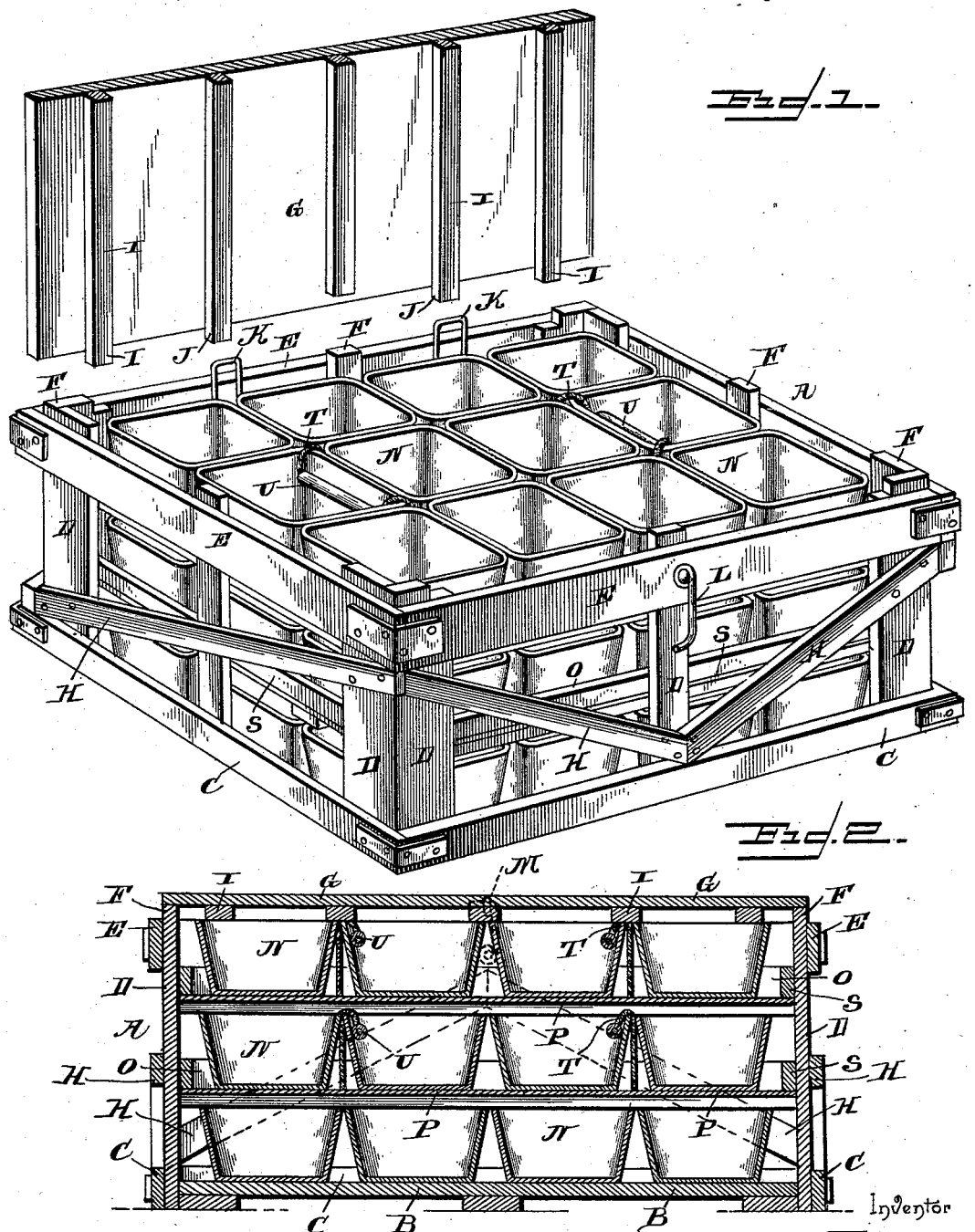
Inventor
Jefferson Z. Taylor
Witnesses
E. H. Stewart
D. P. Wolhaupter
By his Attorneys.
C. A. Snow & Co.

(No Model.) 2 Sheets—Sheet 2.
J. Z. TAYLOR.
SHIPPING CRATE.
No. 522,538. Patented July 3, 1894.
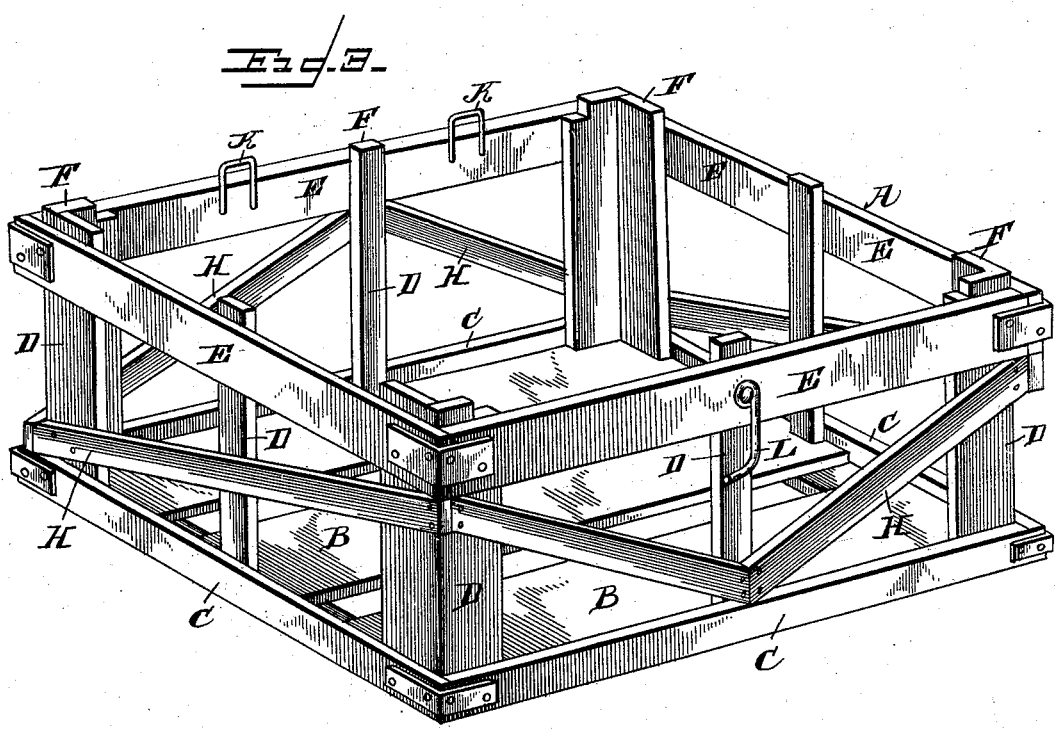
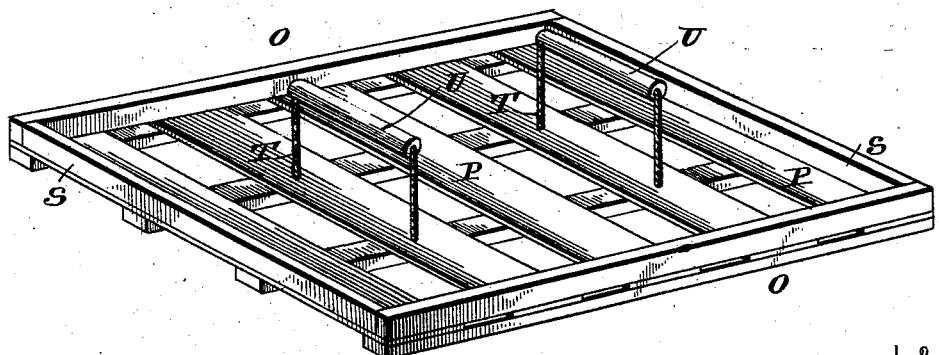
Witnesses
E. K. Stewart
D. P. Nothaupter
Inventor
Jefferson Z. Taylor
By his Attorneys.
C. A. Snow & Co.

UNITED STATES PATENT OFFICE.

JEFFERSON ZACHARY TAYLOR, OF DEAL'S ISLAND, MARYLAND.

SHIPPING-CRATE.

SPECIFICATION forming part of Letters Patent No. 522,538, dated July 3, 1894.

Application filed December 4, 1893. Serial No. 492,749. (No model.)

*To all whom it may concern:*

Be it known that I, JEFFERSON ZACHARY TAYLOR, a citizen of the United States, residing at Deal's Island, in the county of Somerset and State of Maryland, have invented a new and useful Shipping-Crate, of which the following is a specification.

This invention relates to shipping crates; and it has for its object to provide an improved crate of this character which shall be sufficiently strong for all purposes required of it, while at the same time being of a simple, inexpensive construction, so as to be used as a gift-crate.
To this end the main and primary object of the present invention is to combine cheapness and strength, and also to provide a crate in which there shall be a free ventilation to the fruit therein.
The invention also contemplates a crate which, while possessing the advantages noted, shall be extremely light, thereby securing economy of freight and cartage charges, and furthermore to combine with such crate, fruit trays especially adapted to be used in connection therewith, and which shall securely hold the fruit or berry boxes firmly in position, and shall also greatly facilitate the quick inspection of the fruit throughout the entire crate, and also the handling thereof on the field as well as in vending.

With these and other objects in view which will readily appear as the nature of the invention is better understood, the same consists in the novel construction, combination and arrangement of parts hereinafter more fully described, illustrated and claimed.

In the drawings:—Figure 1 is a perspective view of my improved crate with the lid or cover thrown open and detached. Fig. 2 is a vertical transverse sectional view of the crate made up for shipment with the berry boxes arranged on the trays therein. Fig. 3 is a detail in perspective of the crate with the trays removed, and the lid or cover detached. Fig. 4 is a detail in perspective of one of the lift trays.

Referring to the accompanying drawings, A represents a substantially rectangular shipping crate constructed in accordance with the present invention, and this crate A, is preferably provided with a slatted bottom B, which admits of a free circulation of air, but which may be substituted for by a plain imperforate bottom if found desirable. The bottom of the crate B has secured to the side and end edges thereof the horizontal lower crate rails C, to which rails are securely fastened, by means of suitable fastenings, the lower ends of the upright side slats D.

To carry out the light-weight and economical construction of the crate, I employ as few of these upright side slats D, as possible, and as clearly illustrated in Figs. 1 and 3 of the drawings, I generally employ three upright slats for each side and end wall of the crate, one slat being arranged at each side and end corner to form strengthened end corners, and the other slat being arranged at an intermediate point. The upper ends of the upright side slats D, are connected by the upper horizontal crate rails E, which are securely attached or fastened to said slats, and serve to practically complete the side and end walls of the crate, which walls are formed substantially by the said upper and lower horizontal rails, and the connecting upright slats. A construction is thus provided which may be made sufficiently strong to stand shipment and handling, while at the same time being very light and admitting of a free circulation or ventilation of air.

The upright side slats D, which connect the upper and lower slat rails of the crate are projected above the upper rails E, to form projected stop ends F, which prevent the lid or cover G, from sliding off at either side or end of the crate as will be more particularly referred to, and the construction of the crate sides and ends just described, is supplemented by the diagonally arranged crate braces H. The diagonally arranged crate braces H, are secured to the outside of each side and end wall of the crate, formed by the horizontal rails and upright slats, and extend from the upper to the lower rails, being attached at their abutting extremities to said upright slats. At the ends of the crate only one of the diagonally arranged braces H, is necessary, but at the front and rear sides, thereof,

I preferably employ a pair of these braces, such as illustrated, the braces of each pair having their adjacent ends meet and fastened to the center one of the upright side slats D, and by reason of employing a pair of the braces H, at the opposite sides of the crate, the continuity of the zigzag bracing is not interrupted.

It will be clearly seen by reference to Fig. 3 of the drawings, that the braces H, alternate with each other continuously in diagonally opposite directions, so as to complete a zigzag bracing which gives great strength to the side and end walls of the crate, while at the same time serving to fill in the spaces between the slats D.

The lid or cover G, which is adapted to be placed over the open top of the crate on the stop ends F is provided upon the under side thereof with a series of parallel strengthening slats I, which are adapted to rest on the upper side edges of the crate and therefore strengthen the crate sufficiently to withstand a number of similar crates or other objects piled on top of the same, while at the same time providing for leaving an air space between the bottom of the lid or cover and the upper layer of fruit. Certain of the slats or ribs I, are provided with the projected ends J, which detachably engage the upwardly projected hinge loops K, secured at one top side of the crate, while to the opposite corresponding side of the crate is pivoted the wire hook latch L, adapted to engage an eye M, at the free edge of the lid or cover.

It will be readily seen that by unlatching the hook latch L, the cover G, may be readily detached, and also that when placed in position the latch L, may be bent out of shape so as to securely hold the lid or cover during shipment.

The herein-described crate is designed to accommodate separate tiers or rows of berry boxes N, the lower row or tier of which is preferably arranged on the bottom B, of the crate, and is held from working out from the same by the lower or bottom rail C. The tiers of berry boxes above the bottom tier are preferably arranged in my improved lift trays O. The lift trays O, are constructed in a shape corresponding to that of the crate within which they snugly fit, and are provided with the plain or slatted bottoms P, and the raised end and side pieces S, which serve to hold the berry boxes on the trays and prevent them from working off of the same when being moved or lifted out of the crate, as well as while in the crate. To facilitate the handling of the lift trays O, I preferably employ the flexible handle cords T, attached to the bottom of the tray near its opposite ends and carrying the rigid handles U, which can be conveniently grasped for lifting the trays out and placing the same in position. After releasing the grip on the handles the flexibility of the cords allow the same to fall down out of the way, it being seen that the rigid handles U, will act in the capacity of weights so as to prevent the handle cords from working down between the berry boxes out of the way, after the berry boxes have been arranged in position, with the upper ends of the cords thrown over the top edges of the same and the rigid handles hanging inside of the boxes where they may be always conveniently grasped.

The lift trays O, not only provide for holding the berry boxes in position, but at the same time provide means whereby each tier of berries can be quickly lifted out of the crate for quick inspection, and furthermore, such trays can be taken to and from the field with the berry boxes or baskets, and may also be used as a handy holder for the boxes or baskets in vending berries.

Changes in the form, proportion and the minor details of construction may be resorted to without departing from the principle or sacrificing any of the advantages of this invention.

Having thus described the invention, what is claimed, and desired to be secured by Letters Patent, is—

1. In a shipping crate, the combination of the lower horizontal crate rails secured to the side and end edges of the crate bottom, widely spaced upright side slats attached at their lower ends to said lower crate rails, upper horizontal crate rails fastened to the upper ends of said side slats, and a series of separate diagonally arranged wooden crate braces arranged between the upper and lower crate rails and having directly abutting ends attached to the upper and lower ends of the upright side slats, said braces alternating with each other continuously in diagonally opposite directions, and one of said braces being arranged at each end of the crate body substantially as set forth.

2. The combination of a shipping crate having upright side slats provided with stop ends F projected above the plane of the top rail of the crate body, hinge loops secured at one top side of the crate, a pivoted wire hook latch attached to the opposite side of the crate, and a detachable lid or cover, adapted to be placed over the crate on top of said projected stop ends and provided on its under side with parallel strengthening slats, adapted to rest directly on the top rail of the crate body certain of said slats having projected ends detachably engaging said hinge loops, substantially as set forth.

3. The combination with a shipping crate; of the lift trays adapted to benested within the crate to hold berry or fruit boxes and provided with raised end and side pieces, flexible handle cords attached at opposite points to the bottom of the trays and adapted to be arranged between the berry or fruit boxes held thereon, said handle cords being longer than the depth of the boxes on the trays to provide for overhanging the former when in position on the trays, and rigid handles arranged on said cords and adapted to hang inside of the boxes to hold the handle cords in position for being conveniently grasped, substantially as set forth.

In testimony that I claim the foregoing as my own I have hereto affixed my signature in the presence of two witnesses.

JEFFERSON ZACHARY TAYLOR.

Witnesses:
GEO. A. GOSLEE,
JAMES D. ANDERSON.